United States Patent

Wicki

[11] 4,120,854
[45] Oct. 17, 1978

[54] DISAZO AND TRISAZO DYES HAVING A 1,3-DIAMINO-, DIHYDROXY- OR AMINO-HYDROXY-BENZENE NUCLEUS AND METAL COMPLEXES THEREOF

[75] Inventor: Heinz Wicki, Basel, Switzerland

[73] Assignee: Sandoz Ltd., Basel, Switzerland

[21] Appl. No.: 726,979

[22] Filed: Sep. 27, 1976

Related U.S. Application Data

[63] Continuation-in-part of Ser. No. 563,872, Mar. 31, 1975, abandoned.

[30] Foreign Application Priority Data

| Apr. 10, 1974 [CH] | Switzerland | 5066/74 |
|---|---|---|
| Nov. 14, 1974 [CH] | Switzerland | 15186/74 |
| Nov. 25, 1974 [CH] | Switzerland | 15620/74 |
| Nov. 25, 1974 [CH] | Switzerland | 15621/74 |

[51] Int. Cl.² ............... C09B 33/02; C09B 33/20; C09B 45/24; C09B 45/34
[52] U.S. Cl. ............... 260/145 C; 260/145 R; 260/145 A; 260/148; 260/169; 260/173; 260/184
[58] Field of Search ........... 260/145 R, 145 C, 145 A, 260/169, 173

[56] References Cited

U.S. PATENT DOCUMENTS

| 2,045,090 | 6/1936 | Lange et al. ............. 260/145 C X |
| 2,175,187 | 10/1939 | Fellmer .................... 260/145 C |
| 2,200,445 | 5/1940 | Fellmer .................... 260/145 C X |
| 3,406,160 | 10/1968 | Wicki ...................... 260/145 C |

FOREIGN PATENT DOCUMENTS

| 2,163,675 | 7/1973 | France ................. 260/145 C |
| 670,935 | 1/1939 | Fed. Rep. of Germany ....... 260/145 C |
| 675,558 | 5/1939 | Fed. Rep. of Germany ....... 260/145 C |
| 707,225 | 6/1941 | Fed. Rep. of Germany ....... 260/145 C |

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

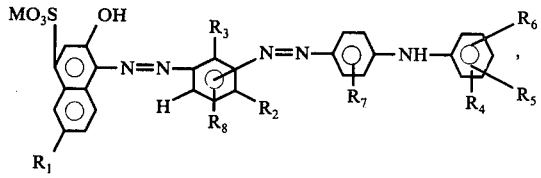

in which
$R_1$ is hydrogen or nitro,
each of $R_2$ and $R_3$, independently, is —OH or —NH$_2$,
$R_4$ is hydrogen, nitro or (C$_{1-4}$) alkyl,
$R_5$ is hydrogen, nitro or (C$_{1-4}$) alkoxy,
$R_6$ is hydrogen, (C$_{1-4}$) alkyl, (C$_{1-4}$) alkoxy, —COOM or —SO$_3$M,
$R_7$ is hydrogen or —SO$_3$M,
$R_8$ is hydrogen or the radical of a diazo component, and
M is a hydrogen ion or a non-chromophoric cation, and mixtures thereof, in metallized form or unmetallized form, which compounds in metallized form are useful as dyes for paper and leather. The dyeings exhibit notable fastness to light, hard water, washing, perspiration, alkali, acid and buffing.

43 Claims, No Drawings

DISAZO AND TRISAZO DYES HAVING A 1,3-DIAMINO-, DIHYDROXY- OR AMINO-HYDROXY-BENZENE NUCLEUS AND METAL COMPLEXES THEREOF

This application is a continuation-in-part of application Ser. No. 563,872, filed Mar. 31, 1975 and now abandoned.

The present invention relates to metallizable azo compounds, metal complexes thereof, their production and use.

More particularly the present invention provides compounds of formula I,

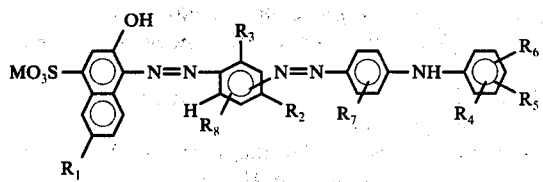

in which $R_1$ signifies a hydrogen atom or a nitro group, each of $R_2$ and $R_3$, independently, signifies —CH or —$NH_2$, $R_4$ signifies a hydrogen atom, a nitro group or a ($C_{1-4}$) alkyl radical, $R_5$ signifies a hydrogen atom, a nitro group or a ($C_{1-4}$) alkoxy radical, $R_6$ signifies a hydrogen atom, a ($C_{1-4}$) alkyl or ($C_{1-4}$) alkoxy radical or a —COOM or —$SO_3M$ group, $R_7$ signifies a hydrogen atom or a —$SO_3M$ group, $R_8$ signifies a hydrogen atom or the radical of a diazo component, and M signifies a hydrogen ion or a nonchromophoric cation, and mixtures thereof, in metallized or unmetallized form.

The metallized compounds of formula I are 1:1 or 1:2 metal complexes. The 1:2 metal complexes according to the invention are complexes of the compounds of formula I or complexes of a compound of formula I and another metallizable azo compound.

The present invention further provides a process for the production of compounds of formula I, as defined above, and 1:1 and 1:2 complexes thereof, as defined above comprising:

(a) coupling the diazo derivative of a compound of formula III,

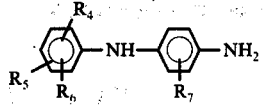

in which $R_4$ to $R_7$ are as defined above,
or a mixture of such compounds and, where required, the diazo derivative as $R_8$, or a mixture of such derivatives, in any desired order, preferably first coupling the diazo derivative of formula III, with a compound of formula II,

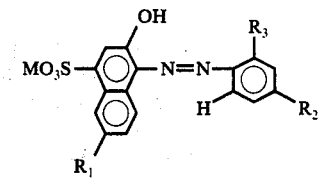

in which $R_1$ to $R_3$ and M are as defined above;

(b) reacting a compound of formula I, as defined above, or a mixture of such compounds or a mixture of a compound of formula I and a further metallizable compound with a metal-donating compound to obtain a 1:1 or 1:2 metal complex of a compound of formula I, (c) coupling the diazo derivative of a compound of formula III, as defined above, or a mixture of such compounds and, where required, coupling the diazo derivative as $R_8$, or a mixture of such derivatives in any desired order, preferably first coupling the diazo derivative of a compound of formula III, with a 1:1 or 1:2 metal complex of a compound of formula II, as defined above, to obtain a 1:1 or 1:2 metal complex of a compound of formula I, as defined above;

(d) coupling the diazo derivative of a compound of formula III, as defined above, or a mixture of such compounds, and where required coupling the diazo derivative as $R_8$ or a mixture of such derivatives in any desired order, preferably coupling the diazo derivative of a compound of formula III first, with a 1:2 complex of a compound of formula II and a further metallizable compound, (e) reacting a 1:1 metal complex of a compound of formula I, as defined above, with a further metallizable azo compound to obtain a 1:2 metal complex of a compound of formula I and further metallizable azo compound;

(f) coupling the diazo derivative as $R_8$ with a 1:1 or 1:2 complex of a diazo compound of formula I.

Preferably, $R_8$ is the radical of a diazo component having higher coupling energy than the diazo derivative of formula III, thus, the introduction of the radical $R_8$ is preferably the last coupling reaction.

Coupling may be carried out according to conventional methods. Suitably, the coupling of the diazo derivative of formula III with a compound of formula II or with a complex containing the compound of formula II is carried out at temperatures from 0° to 25° C, preferably from 4° to 5° C. The reaction is conveniently conducted in aqueous medium at a pH of at least 5.

The coupling of the diazo derivative as $R_8$ with the compound of formula VIII,

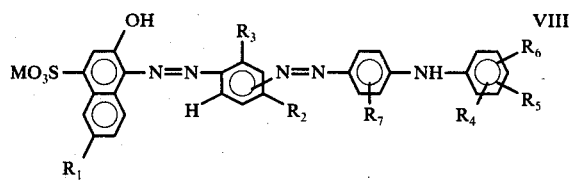

in which $R_1$ to $R_7$ are as defined above,
or a complex containing the compound of formula VIII, is suitably carried out at temperatures from 0° to 25° C, preferably from 4° to 5° C. The reaction is preferably conducted in aqueous medium at a pH from 4 to 9. A coupling accelerator may also be employed. As examples of suitable coupling accelerators may be given urea, pyridine and Cellosolve.

The preferred metal complexes are complexes of copper, iron, cobalt, chromium and nickel. Especially preferred complexes are 1:1 copper, 1:1 nickel and 1:2 cobalt, iron and chromium complexes.

Metal complex formation may be effected by known methods. For example, 1:2 iron complexes may be formed using an iron salt. The preferred pH is from 3.5 to 6, more preferably from 4 to 4.5. Suitable reaction temperatures are in the range of from 95° C to reflux temperature or even higher temperatures, for example up to 120° C, when working under pressure. 1:2 Cobalt and chromium and 1:1 nickel complexes may be formed under similar temperature conditions. Advantageously, for forming cobalt complexes the pH is from 4 to 10, for nickel complexes from 3.5 to 6, and for chromium complexes from 2 to 10. The reaction may be conducted in aqueous, aqueous-organic or organic medium. Preferred organic solvents are those which have a boiling point over 100° C, are miscible with water and in which the compounds to be complexed and their metal salts are soluble. Examples of suitable solvents are alcohols, ether alcohols and amides e.g. Cellosolve, Methylcellosolve, formamide and dimethylformamide. Organic solvents are preferably used in the preparation of chromium complexes.

Copper complexes may be formed in aqueous medium under neutral to alkaline conditions, preferably at a pH of from 7.5 to 10. The reaction is advantageously effected in the presence of excess ammonia. Suitable reaction temperatures are above 70° C, preferably from 80° to 100° C, optionally under pressure. The amount of copper compound employed is preferably such that at least 1 mol of copper is provided per mol azo dyestuff. By the term 'excess ammonia' is meant an amount which exceeds that which is coordinately bound by the copper, and is preferably sufficient so that the copper salt is dissolved therein.

Examples of suitable metal-donating compounds are as follows:
 for copper: cupric chloride, acetate, formate and sulphate
 for iron: ferrous sulphate and nitrate, ferric sulphate and nitrate or ferric chloride
 for nickel: nickel formate, acetate and sulphate
 for chromium: chromium trioxide, chromic fluoride, sulphate, formate and acetate, potassium or ammonium chromium sulphate, sodium and potassium chromate and sodium and potassium bichromate
 for cobalt: cobaltous formate, sulphate, acetate and chloride, cobaltic chloride and acetate.

In the preparation of 1:2 complexes, advantageously at least 1 mol, but preferably less than 2 mols, of metal per 2 mols of azo compound are employed.

It is advantageous when producing asymmetrical 1:2 complexes, especially in the case of 1:2 chromium complexes, to prepare the corresponding 1:1 metal complexes first, and then to react these complexes with a further metallizable azo dyestuff to form the desired asymmetrical 1:2 metal complexes.

Mixtures of metal complexes comprising complexes of different metals are also provided by the present invention. Such complexes may be formed by reacting the azo dyes with different metal-donating compounds, preferably by forming the metal complex of one metal and subsequently reacting any uncomplexed azo compound in the reaction mixture with a further metal-donating compound.

In the compounds of formula I, when $R_6$ signifies the radical of a diazo component, it is preferably of a mononuclear diazo component, more preferably a radical of formula IV,

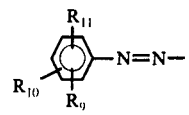

IV in which
 $R_9$ signifies a hydrogen atom or a hydroxy, $-NH_2$, $(C_{1-4})$ alkyl or $(C_{1-4})$ alkoxy group,
 $R_{10}$ signifies a hydrogen atom or a nitro, $-COOM$ or $-SO_3M$ group, in which M is as defined above, and
 $R_{11}$ signifies a hydrogen or halogen atom or a nitro or $(C_{1-4})$ alkyl group.

By halogen is meant chlorine, bromine, fluorine or iodine, with chlorine being preferred.

Preferred amines of formula IV are those where at least one, preferably one or two, of $R_9$, $R_{10}$ and $R_{11}$ signifies a hydrogen atom.

Examples of $R_8$ are the diazo component radicals of formula IV where all three of $R_9$, $R_{10}$ and $R_{11}$ signify hydrogen; where two signify hydrogen and the third signifies nitro, $-COOM$ or methoxy; where one signifies hydrogen and the other two are the same and signify $-NO_2$ and $CH_3$; where one signifies hydrogen and the other two are different and signify $-SO_3M$ and $-OCH_3$, $-NO_2$ and $-SO_3M$, $-NO_2$ and $-CH_3$, $-NO_2$ and Cl, OH and Cl, $-OH$ and $-NO_2$, or $-OH$ and $-SO_3M$; where all three of $R_9$, $R_{10}$ and $R_{11}$ have a significance other than hydrogen and two signify $-NO_2$ and the third signifies $-OH$; or where each of $R_9$, $R_{10}$ and $R_{11}$ are different and signify $-OH$, $-SO_3M$ and $-NO_2$, respectively; and the radical of the formula

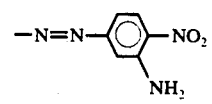

Whilst any metallizable compound may be used as the further metallizable azo compound, those azo compounds which contain an aromatic nucleus on either side of the azo group substituted by a metallizable group, e.g. hydroxy or amino, in a position ortho to the azo group are preferred.

Examples of such further metallizable azo compounds are compounds of formula V,

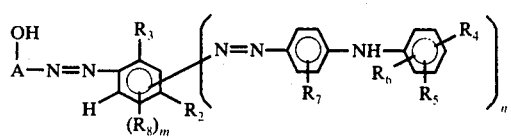

V in which
 each of $R_2$ and $R_3$, independently signifies $-OH$ or $-NH_2$, and A signifies a further unsubstituted or substituted benzene or naphthalene radical in which the hydroxy group is in a position ortho to the azo group, $R_4$, $R_5$, $R_6$, $R_7$, and $R_8$ are as defined above, n is 0 or 1, and m is 0, 1 or 2, provided that the sum of $m + n$ is not more than 2, such compounds where trisazo, preferably containing at least one sulpho group.

Preferred further metallizable compounds are compounds of formula II, as defined above, or compounds of formula VI or VII,

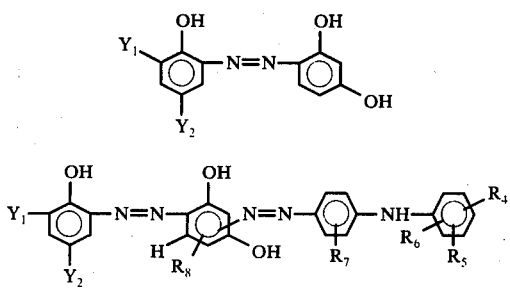

in which $R_4$ to $R_8$ are as defined above, $Y_1$ signifies a hydrogen or chlorine atom or a —$SO_3M$ or nitro group, $Y_2$ signifies a chlorine atom or a —$SO_3M$ or nitro group, and M is as defined above.

Thus, a 1:2 complex of a compound of formula I, or a complex of a compound of formula I and a further metallizable azo compound, can be formed by coupling the diazo derivative of an amine of formula III, as defined above, or of a mixture of such amines, and, where required, the diazo derivative as $R_8$ or a mixture of such derivatives, with a complex of formula IX,

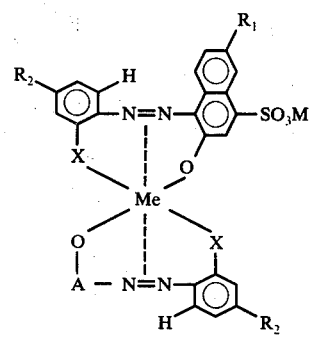

in which each X, independently, signifies —NH— or —O—,

Me signifies iron, cobalt, or chromium, and

A, $R_1$, $R_2$ and M are as defined above, employing at least one mol of the diazo derivative of formula III and 0, 1, 2 or 3 mols of the diazo derivative as $R_8$ per mol of compound of formula IX, with the proviso that the molar ratio of diazonium compounds to the compound of formula IX is not more than 4:1.

As examples of the compounds of formula IX may be given those of formula X,

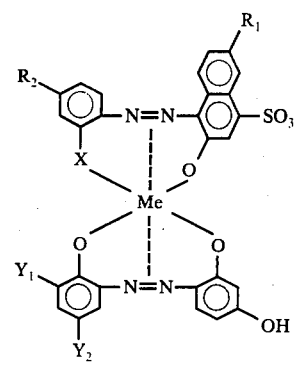

in which $R_1$, $R_2$, X, $Y_1$, $Y_2$, Me and M are as defined above, or, preferably, those formed entirely from a compound of formula II, especially those of two identical compounds of formula II.

Preferably, the diazo derivative of formula III, or a mixture thereof, is coupled with a compound of formula IX in a 1:1 to 2:1 molar ratio and, where required, the diazo derivative as $R_8$ or a mixture thereof is coupled with the product in a 1:1 to 2:1 molar ratio.

Preferred compounds of formula I, are those where $R_8$ signifies the radical of a diazo component, more preferably a diazo radical of formula IV, as defined above.

In the compounds of formula I, any alkyl or alkoxy radical preferably contains 1 or 2 carbon atoms. $R_1$ preferably signifies a nitro group and $R_2$ and $R_3$ preferably signify —OH. Each of $R_4$, $R_5$ and $R_6$, independently, preferably signifies hydrogen or an electron attracting substituent; when any two of $R_4$, $R_5$ and $R_6$ signify electron attracting substituents these substituents are preferably in a meta or para position to each other; when all three of $R_4$, $R_5$ and $R_6$ signify electron attracting substituents, they are preferably in positions meta to each other.

When $R_7$ signifies a —$SO_3M$ group, it group is preferably in a position meta to the azo group. Those compounds where at least one of $R_4$, $R_5$, $R_6$ and $R_7$ has a significance other than hydrogen are preferred. Compounds and complexes where up to 3 of $R_4$, $R_5$, $R_6$ and $R_7$ signify hydrogen are especially preferred.

Preferably, at most one of $R_6$ and $R_7$ signifies a —$SO_3M$ group. The trisazo compounds of formula I preferably contain at most three —$SO_3M$ groups, the disazo compounds at most two —$SO_3M$ groups. Compounds of formula I which contain at least two hydrosolubilizing groups (i.e., —$SO_3M$ and —$COOM$) are preferred.

By electron attracting substituents, as used throughout, is meant —$NO_2$, —$SO_3M$ and —$COOM$ groups.

Preferably M signifies hydrogen, lithium, sodium or potassium or $N^{\oplus}(R)_4$ wherein each R is, independently, hydrogen, $(C_{1-3})$alkyl or hydroxy$(C_{2-3})$alkyl, other than α-hydroxyalkyl, with the proviso that when one or more of the symbols R signifies hydroxyalkyl at least one R signifies hydrogen. Examples of such ammonium ions are ammonium, triethylammonium, tetramethylammonium and mono-, di- and triisopropanolammonium. Sodium and potassium are the preferred alkali metal cations with sodium being more preferred. M is preferably hydrogen, sodium or $N^{\oplus}H_4$.

Preferred compounds of formula I are those in which $R_1$ signifies —$NO_2$, each of $R_2$ and $R_3$ signify —OH, each of $R_4$, $R_5$, $R_6$ and $R_7$ signifies a hydrogen atom or an electron attracting substituent, $R_4$, $R_5$ and $R_6$, when other than hydrogen being ortho or para to the amino group and $R_7$, when other than hydrogen, being ortho to the amino group, and $R_8$ signifies a diazo component radical, preferably a radical of formula IV, as defined above.

Especially preferred compounds of formula I, are those of formula Ib

The preferred compounds of formula I are those of the formula

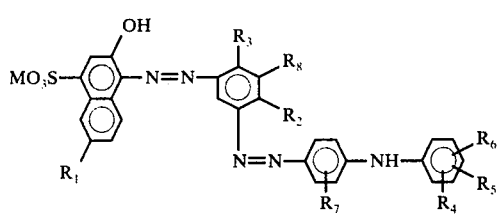    I', wherein $R_1$, $R_2$, $R_3$, $R_4$, $R_5 R_6$, $R_7$, $R_8$ and M are as defined in connection with formula I, and the metal complexes thereof, particularly the 1:1 and 1:2 metal complexes thereof, and mixtures of such metal complexes, and especially the trisazo compounds of formula I' wherein $R_8$ is a radical of formula IV, and the metal complexes thereof. The preferences set forth above and below for the compounds of formula I in both metallized and unmetallized form apply equally to the compounds of formula I'.

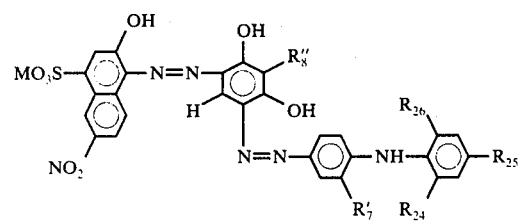    Ib in which $R_8''$ signifies a diazo component radical of formula IV, as defined above, either, each $R_{24}$, $R_{25}$ and $R_{26}$ signifies a hydrogen atom and $R_7'$ signifies —$SO_3M$ or $R_7'$ signifiees a hydrogen atom, and either, one of $R_{24}$ and $R_{25}$ signifies nitro and the other signifies —$SO_3M$, and $R_{26}$ signifies hydrogen, or each of $R_{25}$ and $R_{26}$ signifies nitro and $R_{24}$ signifies —COOM, and M is as defined above.

The preferred metal complexes are 1:1 copper and 1:1 nickel complexes of the compounds of formula I; 1:2 iron, cobalt and chromium complexes of a compound of formula I; and 1:2 iron, cobalt and chromium complexes of a compound of formula I and a further metallizable compounds, the 1:2 complexes of compounds of formula I being preferred, in particular the iron and cobalt complexes. Furthermore, with regard to mixed metal complexes, those which are mixtures of iron and cobalt complexes are preferred.

It will be appreciated that when $R_8$ signifies the radical of a diazo component in a compound of formula I or VII, as defined above, and such compounds of formula I is complexed with another compound of formula I, or a compound of formula VII, any hydroxy or carboxy group ortho to the azo group in the radical as $R_8$ would be available, together with any hydroxy group as $R_2$ to form a metal complex bond.

The negative charge on the metal atom in the 1:2 metal complexes may be compensated by hydrogen ions or non-chromophoric cations. Suitable such non-chromophoric cations are those mentioned above for M. The ions which compensate the charge on the metal may be the same as M or different therefrom; preferably they are the same. Complexes which are in the free acid or ammonium salt from are preferred, with the free acid form being especially preferred.

The compounds of formulae III and IV are known or may be produced in conventional manner from available starting materials.

The azo compounds of formula V are known or may be produced in conventional manner from available starting materials. The compounds of formula II are known and may be obtained by coupling the diazo derivative of an amine of formula XI,

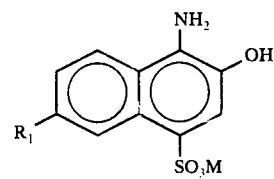    XI in which $R_1$ and M are as defined above,
with a compound of formula XII,

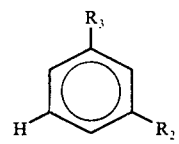    XII in which $R_2$ and $R_3$ are as defined above.

The coupling reaction is carried out in conventional manner. Suitably, coupling is effected in a basic medium, preferably aqueous, at a pH of at least 7.5. The reaction temperature may be in the range of from 0° to 25° C, preferably 4° to 5° C. The pH may be adjusted by the addition of alkali metal hydroxides or carbonates or ammonia or amines. It has been found that when $R_2$ and $R_3$ are the same, coupling takes place in the position indicated by the arrow

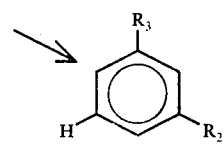

whereas when $R_2$ and $R_3$ are different a mixture is obtained which can be separated in a conventional manner. Thus, the present invention still further provides mixtures of compounds and complexes of formula I formed by employing a mixture of compounds of formula II. Such mixtures may be separated into the individual components by known methods, but are preferably employed as such without separation.

The metal complexes and mixtures thereof according to the invention are useful as hydro-soluble dyes. They may be used for dyeing substrates which are dyeable with anionic dyes. As examples of suitable substrates may be given cellulosic substrates, preferably natural and synthetic polyamides and more particularly leather. Any type of leather is suitable and may be dyed in conventional manner. The complexes according to the invention have notable dyeing capacity for leather of weak affinity. Dyeings of deep full brown shades may be obtained which have notable fastness to light, dry cleaning, hard water, washing, perspiration, alkali, acid and buffing. The dyestuffs have good penetration on suede leather. In addition, the dyestuffs according to the invention may be used for dyeing sheep skins whereby they dye the leather substrate but leave the wool substrate effectively undyed.

Paper may be dyed with the complexes of the present invention either in the stock or in sheet form according to conventional methods.

The following Examples serve to further illustrate the invention. In the Examples all parts and percentages are by weight and all temperatures are in degrees Centigrade.

EXAMPLE 1

29.5 Parts of the diazo derivative of 1-amino-2-hydroxy-4-sulpho-6-nitronaphthalene (nitro-diazoxide acid Na-salt) are entered with stirring into a solution of 11 parts of 1,3-dihydroxybenzene in 200 parts of water and 35 parts of calc. soda at 0°. Coupling is completed after 2 hours. 26.4 Parts of the diazo derivative of 4-amino-2-sulpho-sulfodiphenylamine is allowed to flow, over the course of 30 minutes at a pH of 9.5, into the solution of the resulting monoazo dyestuff and the mixture is stirred for 1 hour. 13.8 Parts of the diazo derivative of 1-amino-4-nitrobenzene is added to the resulting disazo dyestuff at a pH of 6 over the course of 30 minutes, and the mixture is stirred for 3 hours.

The resulting trisazo dyestuff is heated to 95°, then 13 parts of crystalline iron trichloride are added, and the mixture is kept at this temperature for 1 hour at a pH of 4.5. After cooling to 20°, the 1:2 metal complex is filtered off.

It dries as a black-brown powder and dyes leather in dark brown shades which have notable fastness to light, washing, perspiration, hard water, acid and alkali and corresponds to the formula

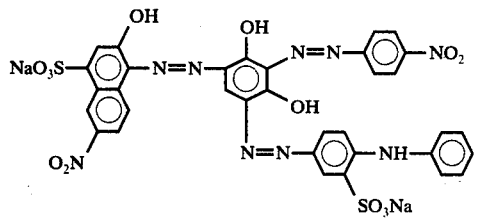

EXAMPLE 2

Replacing the 13 parts of crystalline iron chloride used in Example 1 with 14 parts of crystalline cobaltic sulphate and carrying out the reaction at a pH of 9, by the addition of sodium hydroxide, a 1:2 complex is obtained after salting out, in the form of a sodium salt or by the addition of free acid, in the form of free acid, which dyes leather in dark grey-brown shades, which dyeings have notable fastness to light, hard water, washing, perspiration, acid and alkali.

EXAMPLE 3

Replacing the 14 parts of cobaltic sulphate used in Example 2 with the corresponding amount of nickel sulphate and using a pH between 3.5 and 5, a 1:1 nickel complex is obtained which dyes leather in dark brown shades with similar properties.

EXAMPLE 4

The trisazo dyestuff produced as described in Example 1 is dissolved in formamide, heated to 120° and 25 parts of chrome alum are added. After the 1:2 complex has been formed, the dyestuff is separated out by pouring it into a 20% common salt solution and filtered; it dries as a black-brown powder which dyes leather in deep reddish brown shades. The dyestuff may be obtained in the free acid form by separating it out by the addition of acid.

EXAMPLE 5

The trisazo dyestuff produced as described in Example 1 is heated to 80° and treated with copper for 1 hour at 80° by adding 25 parts of crystallised copper sulphate in the presence of a slight excess of ammonia. After cooling to 20°, the product is separated out by sprinking in common salt, filtered and dried. The product obtained is a 1:1 complex in the ammonium salt form and is a black powder which dyes leather in dark brown-grey shades, which dyeings have notable fastness to light, washing, perspiration, hard water, acid and alkali.

In the following Table 1 metallizable azo dyestuffs of the formula

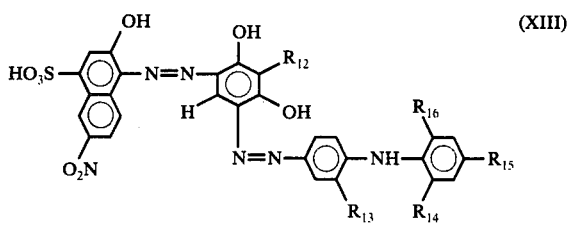

are listed which are characterized by the radicals $R_{12}$ to $R_{16}$; the 1:2 Co-complex compounds and the 1:1 Cu-complex compounds thereof dye leather in dark grey-brown shades, the 1:2 Fe- and the 1:1 Ni-complex compounds in dark brown shades and the 1:2 Cr-complex compounds in dark reddish brown shades. They may be produced in analogous manner so that described in the above Examples and are in the sodium salt form.

TABLE 1

| Example No. | $R_{12}$ | $R_{13}$ | $R_{14}$ | $R_{15}$ | $R_{16}$ |
| --- | --- | --- | --- | --- | --- |
| 6 | —N=N—⟨◯⟩—NO$_2$ | —H | —H | —NO$_2$ | —SO$_3$H |

TABLE 1-continued

| Example No. | $R_{12}$ | $R_{13}$ | $R_{14}$ | $R_{15}$ | $R_{16}$ |
|---|---|---|---|---|---|
| 7 | $-N=N-$(2-nitrophenyl) | $-SO_3H$ | $-H$ | $-H$ | $-H$ |
| 8 | $-N=N-$(4-methoxyphenyl) | $-H$ | $-NO_2$ | $-NO_2$ | $-COOH$ |
| 9 | $-N=N-$(2-methoxyphenyl) | $-H$ | $-H$ | $-NO_2$ | $-SO_3H$ |
| 10 | $-N=N-$(2-carboxyphenyl) | $-H$ | $-H$ | $-NO_2$ | $-SO_3H$ |
| 11 | $-N=N-$(4-nitro-2-sulfophenyl) | $-H$ | $-H$ | $-NO_2$ | $-SO_3H$ |
| 12 | $-N=N-$(4-carboxyphenyl) | $-SO_3H$ | $-H$ | $-H$ | $-H$ |
| 13 | $-N=N-$(2-chloro-4-nitrophenyl) | $-SO_3H$ | $-H$ | $-H$ | $-H$ |
| 14 | $-H$ | $-H$ | $-H$ | $-NO_2$ | $-SO_3H$ |
| 15 | $-N=N-$(4-carboxyphenyl) | $-H$ | $-H$ | $-NO_2$ | $-SO_3H$ |
| 16 | $-N=N-$(3-methyl-4-nitrophenyl) | $-SO_3H$ | $-H$ | $-H$ | $-H$ |
| 17 | $-H$ | $-SO_3H$ | $-H$ | $-H$ | $-H$ |
| 18 | $-N=N-$(3-chloro-4-hydroxyphenyl) | $-H$ | $-NO_2$ | $-SO_3H$ | $-H$ |
| 19 | $-N=N-$(2,3-dimethylphenyl) | $-SO_3H$ | $-NO_2$ | $-SO_3H$ | $-H$ |
| 20 | $-N=N-$(3-amino-4-nitrophenyl) | $-SO_3H$ | $-H$ | $-H$ | $-H$ |
| 21 | $-N=N-$(2-hydroxy-5-nitrophenyl) | $-SO_3H$ | $-H$ | $-H$ | $-H$ |
| 22 | $-N=N-$(2-hydroxy-3-sulfo-5-nitrophenyl) | $-SO_3H$ | $-H$ | $-H$ | $-H$ |
| 23 | $-N=N-$(2,4-dihydroxy-3,5-dinitrophenyl) | $-SO_3H$ | $-H$ | $-H$ | $-H$ |
| 24 | $-N=N-$(2-hydroxy-4-sulfophenyl) | $-SO_3H$ | $-H$ | $-H$ | $-H$ |

TABLE 1-continued

| Example No. | R12 | R13 | R14 | R15 | R16 |
|---|---|---|---|---|---|
| 25 | 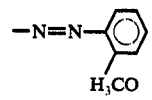 —N=N—C6H4(H3CO)— | —SO3H | —H | —H | —H |

In the following Table 2 further metallizable azo dyestuffs of the formula

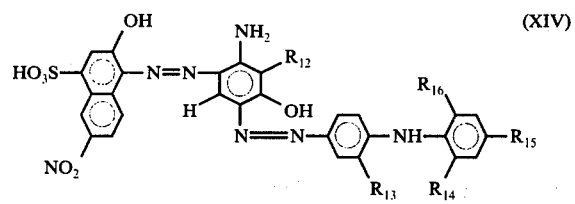

(XIV)

are listed which are characterized by the radicals $R_{12}$ to $R_{16}$; the 1:2 Co-complex compounds and the 1:1 Cu-complex compounds thereof give dyeings on leather of dark grey-brown shades, the 1:2 Fe- and 1:1 Ni-complex compounds of dark brown shades and the 1:2 Cr-complex compounds of dark reddish brown shades. They may be produced in analogy with the procedure of the above Examples and are in the ammonium salt form.

TABLE 2

| Ex. No. | R12 | R13 | R14 | R15 | R16 |
|---|---|---|---|---|---|
| 26 | —N=N—C6H4—NO2 | -SO3H | -H | -H | -H |
| 27 | —N=N—C6H4—OCH3 | -SO3H | -H | -H | -H |
| 28 | —N=N—C6H4(OCH3)— | -SO3H | -H | -H | -H |
| 29 | —N=N—C6H3(NO2)(SO3H)— | -SO3H | -H | -H | -H |
| 30 | —N=N—C6H3(SO3H)(OCH3)— | -SO3H | -H | -H | -H |
| 31 | —N=N—C6H4—NO2 | -H | -SO3H | -NO2 | -H |
| 32 | —N=N—C6H3(NO2)(SO3H)— | -H | -SO3H | -NO2 | -H |
| 33 | —N=N—C6H4—OCH3 | -H | -SO3H | -NO2 | -H |
| 34 | —N=N—C6H4—OCH3 | -H | -SO3H | -NO2 | -H |
| 35 | —N=N—C6H3(SO3H)(OCH3)— | -H | -SO3H | -NO2 | -H |
| 36 | —N=N—C6H3(Cl)—NO2 | -SO2H | -H | -H | -H |
| 37 | —N=N—C6H3(Cl)—NO2 | -H | -SO3H | -NO2 | -H |

In the following Table 3 further metallizable azo dyestuffs of the formula

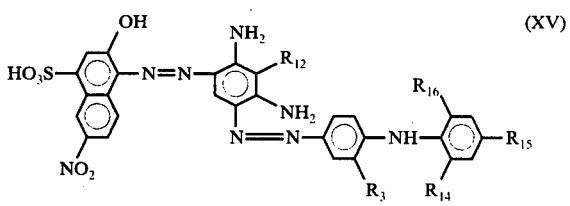

(XV)

are listed which are characterized by the radicals $R_{12}$ to $R_{16}$; the 1:2 Co-complex compounds and the 1:1 Cu-complex compounds thereof give dyeings on leather of dark grey-brown shades, the 1:2 Fe- and 1:1 Ni-complex compounds dark brown shades and the 1:2 Cr-complex compounds dark red-brown shades. They may be produced in analogy with the procedure described in the above Examples and are in the free acid form.

TABLE 3

| Ex. No. | R12 | R13 | R14 | R15 | R16 |
|---|---|---|---|---|---|
| 38 | —N=N—C6H4—NO2 | -SO3H | -H | -H | -H |
| 39 | —N=N—C6H4—Cl | -SO3H | -H | -H | -H |
| 40 | —N=N—C6H4—OCH3 | -SO3H | -H | -H | -H |
| 41 | —N=N—C6H4(OCH3)— | -SO3H | -H | -H | -H |
| 42 | —N=N—C6H3(NO2)(SO2H)— | -SO3H | -H | -H | -H |
| 43 | —N=N—C6H3(SO3H)(OCH3)— | -SO3H | -H | -H | -H |
| 44 | —N=N—C6H4—NO2 | -H | -SO3H | -NO2 | -H |

TABLE 3-continued

| Ex. No. | $R_{12}$ | $R_{13}$ | $R_{14}$ | $R_{15}$ | $R_{16}$ |
|---|---|---|---|---|---|
| 45 | —N=N—⟨phenyl(Cl)⟩—NO$_2$ | -H | -SO$_2$H | -NO$_2$ | -H |
| 46 | —N=N—⟨phenyl⟩—OCH$_3$ | -H | -SO$_3$H | -NO$_2$ | -H |
| 47 | —N=N—⟨phenyl(OCH$_3$)⟩ | -H | -SO$_3$H | -NO$_2$ | -H |
| 48 | —N=N—⟨phenyl(OCH$_3$)⟩—SO$_3$H | -H | -SO$_3$H | -NO$_2$ | -H |
| 49 | —N=N—⟨phenyl(SO$_3$H)⟩—NO$_2$ | -H | -SO$_3$H | -NO$_2$ | -H |

EXAMPLE 50

29.5 Parts of the diazo derivative 1-amino-2-hydroxy-4-sulpho-6-nitronaphthalene are entered with stirring into a solution of 11 parts of 1,3-dihydroxybenzene in 200 parts of water and 35 parts of calc. soda at 0°.

After 2 hours coupling is completed. 26.4 Parts of the diazo derivative of 4-amino-2-sulfodiphenylamine is allowed to flow into the solution of the resulting monoazo dyestuff at a pH of 9.5 over the course of 30 minutes and the mixture is stirred for 1 hour.

12.3 parts of the diazo derivative of 1-amino-2-methoxybenzene is added to the resulting disazo dyestuff at a pH of 9 and is stirred for 1 hour at 5°. After coupling, the resulting trisazo dyestuff is heated to 96°-100° and 7 parts of crystalline cobaltic sulphate are added thereto. The pH is adjusted to 9 and the temperature is kept at 95°-100° over the course of 1 hour. After all the cobalt has been complexed, the pH of the reaction mixture is adjusted to 4-5, then 6.5 parts of iron chloride are added and the mixture is kept at a temperature of 95°-100° for 1 further hour. After cooling, the dyestuff is seperated out by employing common salt and dried.

A mixture consisting of 1:2 cobalt and 1:2 iron complex of the trisazo dyestuff in sodium salt form is obtained which dyes leather in neutral deep brown shades with notable fastness. The unmetallized dye is of the formula

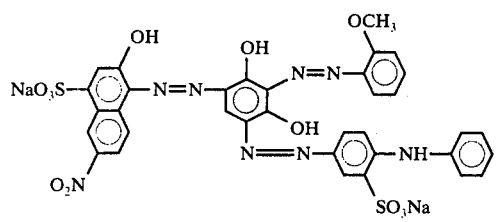

EXAMPLE 51

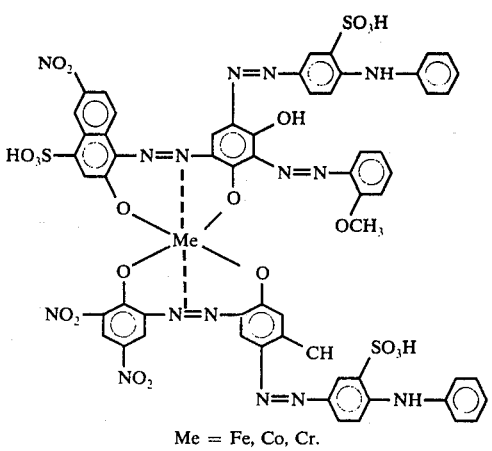

Me = Fe, Co, Cr.

Dyestuff I 29.5 Parts of the diazo derivative of 1-amino-2-hydroxy-4-sulpho-6-nitronaphthalene are entered with stirring into a solution of 11 parts of 1,3-dihydroxybenzene dissolved in 200 parts of water with the addition of 35 parts of calcinated soda at 0°-15°. After 2 hours, coupling is completed. 26.4 parts of the diazo derivative of 4-amino-2-sulfodiphenylamine is allowed to flow into the solution of the resulting monoazo dyestuff at a pH of 9.5, over the course of 30 minutes, and the mixture is stirred for 1 hour until the diazo compound is no longer detectable. 12.3 parts of the diazo derivative of 1-amino-2-methoxybenzene is allowed to flow into the resulting disazo dyestuff at a pH of 9. Reaction is effected at 0°. The mixture is stirred for 1 hour. After coupling, the resulting trisazo dyestuff I is combined with

Dyestuff II which is produced as follows:

19.9 Parts of the diazo derivative of 1-amino-2-hydroxy-3,5-dinitrobenzene are coupled at pH 9 and at 0°-5° with 11 parts of 1,3-dihydroxybenzene; 26.4 parts of the diazo derivative of 4-amino-2-sulfodiphenylamine are added at pH 9 to the resulting monoazo dyestuff and the mixture is stirred at 0°-5° over the course of 2 hours. When coupling is completed, dyestuffs I and II are heated together to 95° and 27 parts of iron-III-chloride (crystalline) are added. The pH is adjusted to 4.5 with hydrochloric acid and the mixture is kept at 95° for 1 hour. The product is separated out by the addition of common salt and filtered. When dry, the dyestuff, which is in the sodium salt form, is a dark brown powder and dyes leather in deep reddish brown shades.

The corresponding Co- and Cr-complexes may be produced by replacing the iron-III-chloride, used above, with cobalt- and chromium-donating copounds employing the conditions as set out in Examples 2 and 4.

EXAMPLE 52

The dyestuff of the formula

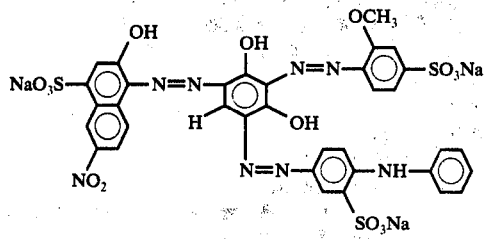

obtained in analogy with the process described in Example 1 may be metallized to form 1:2 cobalt, 1:2 chromium, 1:2 iron, 1:1 copper and 1:1 nickel complexes in analogy with the procedure described in Examples 1 to 5. Among the preferred compounds of this application are those of the formulae

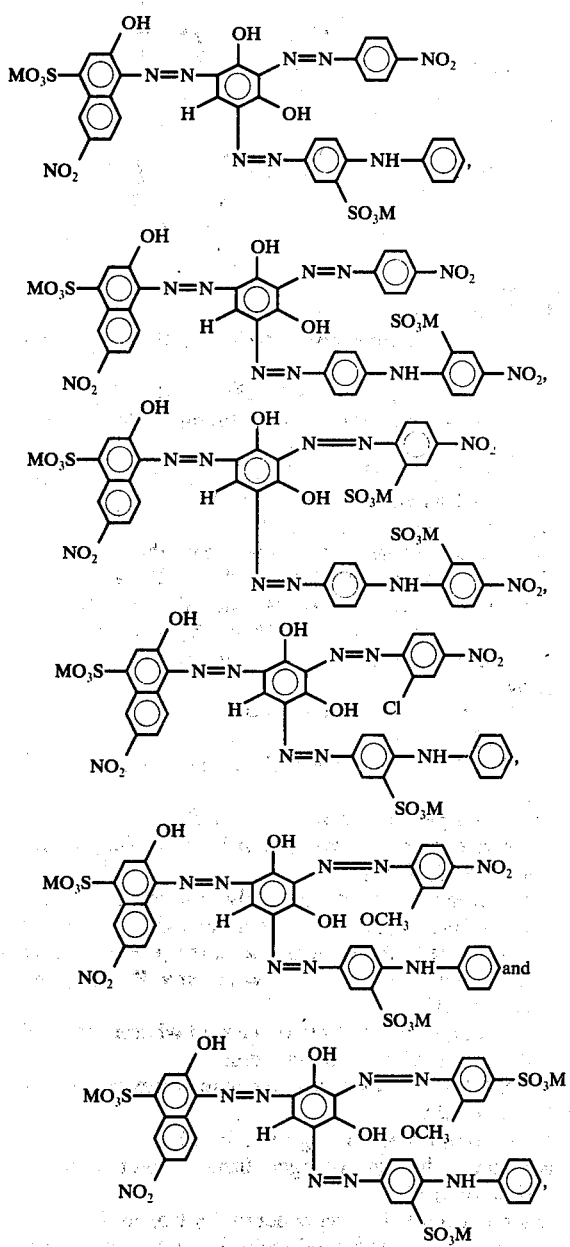

and the 1:2 cobalt and 1:2 iron complexes thereof, wherein M is hydrogen or a non-chromophoric cation, and mixtures of 1:2 iron and 1:2 cobalt complexes of a compound of the formula

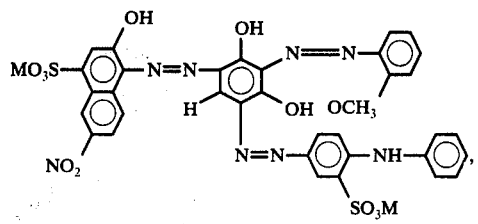

wherein M is hydrogen or a non-chromophoric cation.

Application Example A

100 Parts of newly tanned and neutralised chromium grain leater are milled in the dyeing vessel for 30 minutes in a liquor consisting of 250 parts of water at 55° and 1 part of the dyestuff produced in Example 1, they are treated for 30 minutes in the same bath with 2 parts of an anionic fat-liquor based on sulphonated train oil, and the leathers are dried and finished in the usual manner. An evenly dyed leather in a deep grey-brown shade is obtained.

Application Example B

100 Parts of calf suede leather are milled for 4 hours in the dyeing vessel with 1000 parts of water and 2 parts of ammonia and are dyed as follows in a new bath containing 500 parts of water at 55°, 2 parts of ammonia and 10 parts of the dissolved dyestuff produced in Example 1, for 1 hour and 30 minutes. In order to exhaust the dyebath, 4 parts of formic acid (85%) are slowly added and dyeing is continued until the dyestuff has been completely fixed. The suede leather which is rinsed, dried and finished in the usual manner is evenly dyed in a deep brown shade after buffing the suede side.

Application Example C

100 Parts of chromium-vegetable tanned lamb's leather and 10 parts of the dyestuff obtained in Example 1 are milled for 45 minutes in the dyeing vessel in a liquor consisting of 1000 parts of water at 55° and 1.5 parts of an anionic sperm oil emulsion and the dyestuff is fixed on the leather by slowly adding 5 parts of formic acid (85%) over the course of 30 minutes. After the usual drying and finishing processes, a leather is obtained which is dyed in an even deep grey-brown shade.

Application Example D

A solution of 20 parts of the dyestuff produced in accordance with Example 1 in 847 parts of water, 150 parts of ethyl gylcol and 3 parts of formic acid (85%) is applied by spraying, plushing and pouring to the grain side of a buffed, combination-tanned cow-hide. The leather is dried and finished under mild conditions. A leather dyed in a dark grey-brown shade having notable fastness properties is obtained.

Replacing the dyestuff of Example 1 with the same amount of the dyestuffs of Examples 2 to 51 and employing the procedure of Examples A to D above, leather dyeings with similar properties are obtained, the shade of the dyeings obtained is indicated in the corresponding production Examples or in the introduction to the Tables.

What is claimed is:

1. A 1:1 copper, 1:1 nickel, 1:2 chromium, 1:2 cobalt or 1:2 iron complex of a comound of the formula

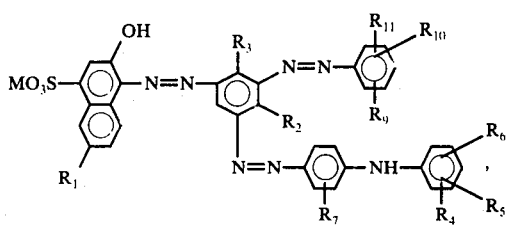

or a mixture of such complexes, wherein
$R_1$ is hydrogen or nitro,
$R_2$ is hydroxy or $-NH_2$,
$R_3$ is hydroxy or $-NH_2$,
$R_4$ is hydrogen, nitro or $C_{1-4}$ alkyl,
$R_5$ is hydrogen, nitro or $C_{1-4}$ alkoxy,
$R_6$ is hydrogen, $C_{1-4}$alkyl, $C_{1-4}$alkoxy, $-COOM$ or $-SO_3M$,
$R_7$ is hydrogen or $-SO_3M$,
$R_9$ is hydrogen, hydroxy, $-NH_2$, $C_{1-4}$alkyl or $C_{1-4}$alkoxy,
$R_{10}$ is hydrogen, nitro, $-COOM$ or $-SO_3M$,
$R_{11}$ is hydrogen, fluoro, chloro, bromo, iodo, nitro or $C_{1-4}$alkyl, and
each M is hydrogen or a non-chromophoric cation,
wherein each 1:2 chromium, 1:2 cobalt and 1:2 iron complex has an additional M balancing the negative charge of the complexed metal atom.

2. A mixture of complexes according to claim 1 of at least two metal complexes of a single compound.

3. A mixture of 1:2 iron and cobalt complexes according to claim 2.

4. A complex according to claim 1.

5. A 1:1 copper complex according to claim 4.

6. A 1:1 nickel complex according to claim 4.

7. A 1:2 iron complex according to claim 4.

8. A 1:2 cobalt complex according to claim 4.

9. A 1:2 chromium complex according to claim 4.

10. A complex according to claim 4
wherein each M is hydrogen, lithium, sodium, potassium or $\oplus N(R)_4$,
wherein each R is independently hydrogen, $C_{1-3}$alkyl or $C_{2-3}$hydroxyalkyl wherein the hydroxy group is not on the α carbon atom, with the proviso that at least one R is hydrogen when any R is $C_{2-3}$hydroxyalkyl.

11. A complex according to claim 10 wherein each M is hydrogen, sodium or ammonium.

12. A complex according to claim 4 wherein at least one of $R_9$, $R_{10}$ and $R_{11}$ is hydrogen.

13. A complex according to claim 12 wherein each alkyl and alkoxy independently has 1 or 2 carbon atoms.

14. A complex according to claim 13 wherein $R_1$ is nitro.

15. A complex according to claim 14 wherein
$R_2$ is hydroxy, and
$R_3$ is hydroxy.

16. A complex according to claim 15 wherein
$R_4$ is hydrogen or nitro,
$R_5$ is hydrogen or nitro, and
$R_6$ is hydrogen, $-COOM$ or $-SO_3M$.

17. A complex according to claim 16 wherein at least one of $R_4$, $R_5$, $R_6$ and $R_7$ is other than hydrogen.

18. A complex according to claim 17 wherein at least one of $R_6$, $R_7$ and $R_{10}$ is $-SO_3M$ or $-COOM$.

19. A complex according to claim 4 wherein
$R_1$ is nitro,
$R_2$ is hydroxy,
$R_3$ is hydroxy,
$R_4$ is hydrogen or nitro,
$R_5$ is hydrogen or nitro,
$R_6$ is hydrogen, $-COOM$ or $-SO_3M$, with the proviso that each of $R_4$, $R_5$ and $R_6$ is ortho or para to the $-NH-$ radical when other than hydrogen, and
$R_7$ is hydrogen or $-SO_3M$, with the proviso that $R_7$ is ortho to the $-NH-$ radical when it is $-SO_3$.

20. A complex according to claim 19 of a compound of the formula

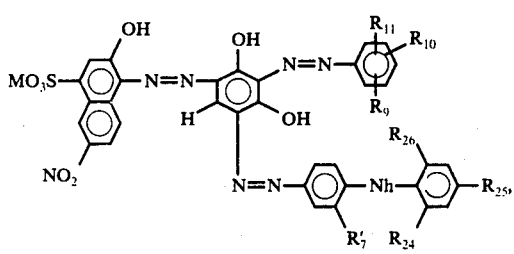

wherein
$R_7'$ is hydrogen or $-SO_3M$,
$R_9$ is hydrogen, hydroxy, $-NH_2$, $C_{1-4}$alkyl or $C_{1-4}$alkoxy,
$R_{10}$ is hydrogen, nitro, $-COOM$ or $-SO_3M$,
$R_{11}$ is hydrogen, fluoro, chloro, bromo, iodo, nitro, or $C_{1-4}$alkyl,
$R_{24}$ is hydrogen, nitro, $-COOM$ or $-SO_3M$,
$R_{25}$ is hydrogen, nitro or $-SO_3M$,
$R_{26}$ is hydrogen or nitro, and
each M is hydrogen or a non-chromophoric cation,
with the provisos that (i) each of $R_{24}$, $R_{25}$ and $R_{26}$ is hydrogen when $R_7'$ is $-SO_3M$, and (ii) one of $R_{24}$ and $R_{25}$ is nitro, the other is $-SO_3M$ and $R_{26}$ is hydrogen or $R_{24}$ is $-COOM$ and $R_{25}$ and $R_{26}$ are nitro when $R_7'$ is hydrogen.

21. A complex according to claim 20 wherein each M is a non-chromophoric cation.

22. A 1:1 copper or nickel complex according to claim 20.

23. A complex according to claim 22
wherein each M is hydrogen, lithium, sodium, potassium or $\oplus N(R)_4$,
wherein each R is independently hydrogen, $C_{1-3}$alkyl or $C_{2-3}$hydroxyalkyl, wherein the hydroxy group is not on the α carbon atom, with the proviso that at least one R is hydrogen when any R is $C_{2-3}$hydroxyalkyl.

24. A complex according to claim 23 wherein each M is hydrogen, sodium or ammonium.

25. A 1:2 iron, cobalt or chromium complex according to claim 20.

26. A complex according to claim 25
wherein each M is hydrogen, lithium, sodium, potassium or $\oplus N(R)_4$,
wherein each R is independently hydrogen, $C_{1-3}$alkyl or $C_{2-3}$hydroxyalkyl wherein the hydroxy group is not on the α carbon atom, with the proviso that at least one R is hydrogen when any R is $C_{2-3}$-hydroxyalkyl.

27. A complex according to claim 26 wherein each M is hydrogen, sodium or ammonium.

28. A 1:2 iron or cobalt complex according to claim 25 of a compound of the formula

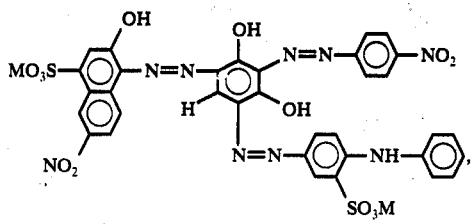

wherein each M is hydrogen or a non-chromophoric cation.

29. The 1:2 iron complex according to claim 28 of the compound of the formula

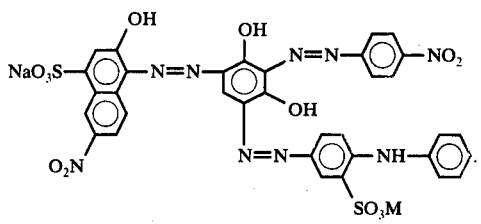

30. A 1:2 cobalt complex according to claim 28 of a compound of the formula

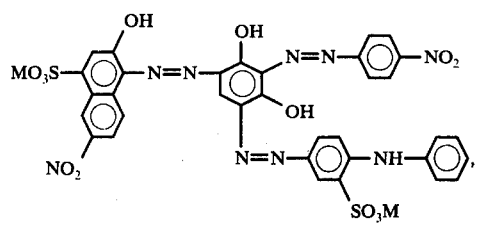

wherein each M is hydrogen or sodium.

31. A 1:2 iron or cobalt complex according to claim 25 of a compound of the formula

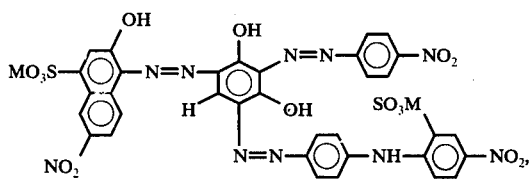

wherein each M is hydrogen or a non-chromophoric cation.

32. A 1:2 iron or cobalt complex according to claim 31 wherein each M is sodium.

33. A 1:2 iron or cobalt complex according to claim 25 of a compound of the formula

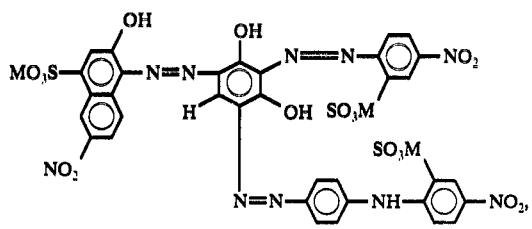

wherein each M is hydrogen or a non-chromophoric cation.

34. A 1:2 iron or cobalt complex according to claim 33 wherein each M is sodium.

35. A 1:2 iron or cobalt complex according to claim 25 of a compound of the formula

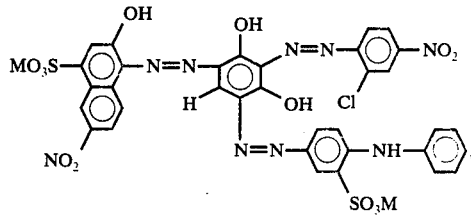

wherein each M is hydrogen or a non-chromophoric cation.

36. A 1:2 iron or cobalt complex according to claim 35 wherein each M is sodium.

37. A 1:2 iron or cobalt complex according to claim 25 of a compound of the formula

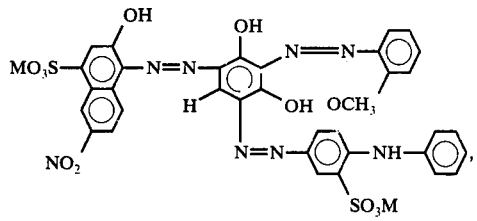

wherein each M is hydrogen or a non-chromophoric cation.

38. A 1:2 iron or cobalt complex according to claim 37 wherein each M is sodium.

39. A 1:2 iron or cobalt complex according to claim 25 of a compound of the formula

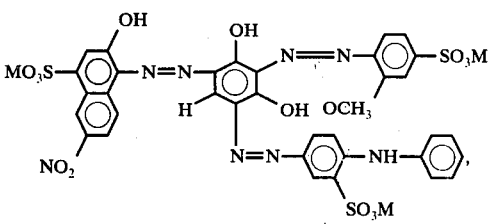

wherein each M is hydrogen or a non-chromophoric cation.

40. A 1:2 iron or cobalt complex according to claim 39 wherein each M is sodium.

41. A 1:2 iron, cobalt or chromium complex according to claim 25 of a compound of the formula

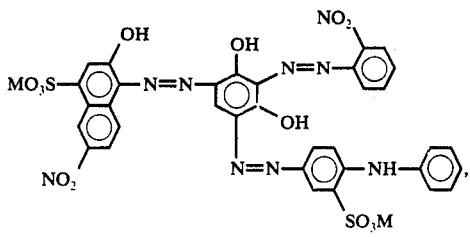
wherein each M is sodium.
42. A 1:2 iron, cobalt or chromium complex according to claim 25 of a compound of the formula
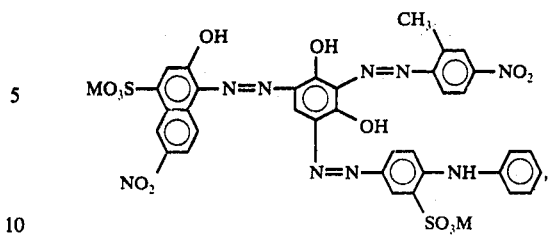
wherein each M is sodium.
43. A mixture of 1:2 iron and 1:2 cobalt complexes according to claim 3 of a compound of the formula
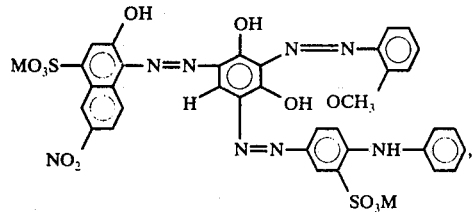
wherein each M is hydrogen or a non-chromophoric cation.
* * * * *